United States Patent [19]

Sedlatschek et al.

[11] Patent Number: 4,493,808

[45] Date of Patent: Jan. 15, 1985

[54] METHOD OF MOLDING A SEWING MACHINE FRAME OF FIBER REINFORCED COMPOSITION

[75] Inventors: Robert Sedlatschek, Bridgewater; Leo E. McGann, Cranford, both of N.J.

[73] Assignee: The Singer Company, Stamford, Conn.

[21] Appl. No.: 384,846

[22] Filed: Jun. 4, 1982

[51] Int. Cl.³ ............................................. B29D 3/02
[52] U.S. Cl. ................................. 264/108; 264/328.2; 264/328.12; 264/328.18
[58] Field of Search ...................... 264/328.12, 328.18, 264/108, 328.2

[56] References Cited

U.S. PATENT DOCUMENTS 4,102,831  7/1978  Osgood ........................... 264/108 X
4,203,732  5/1980  Phaal .............................. 264/108 X

OTHER PUBLICATIONS

"How and Why to Use Glass-Reinforced Injection", Modern Plastics, Mar. 1958, pp. 100-102, 192, 194.

Primary Examiner—Jan Silbaugh
Attorney, Agent, or Firm—Robert E. Smith; Edward L. Bell

[57] ABSTRACT

A sewing machine bed having main and open channel sections is molded of glass reinforced thermosetting plastic composition which is injected into the mold through a side gate located opposite the juncture of the main and channel sections providing advantageous fiber orientation resulting in dimensional stability and freedom from warpage.

3 Claims, 3 Drawing Figures

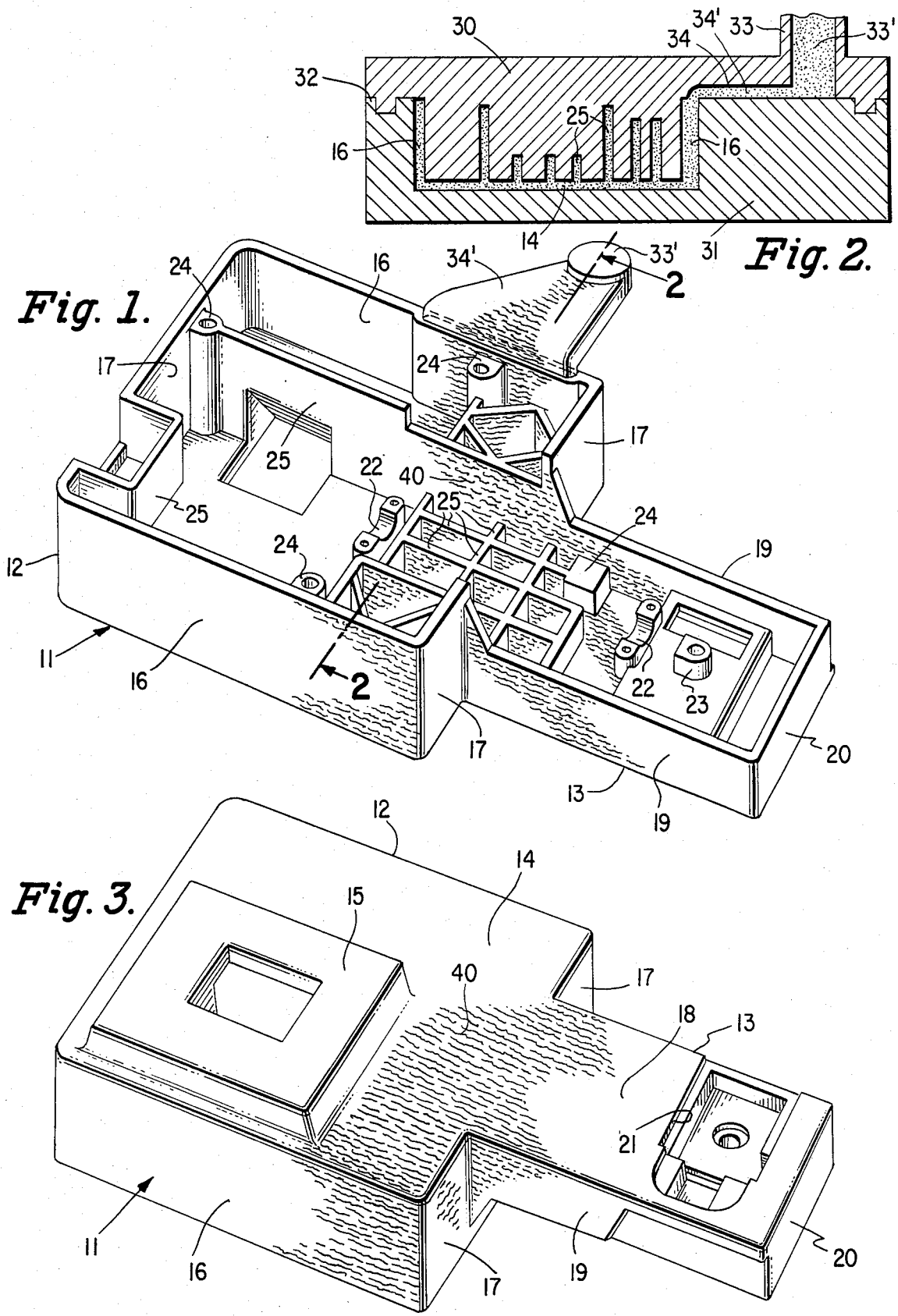

METHOD OF MOLDING A SEWING MACHINE FRAME OF FIBER REINFORCED COMPOSITION

FIELD OF THE INVENTION

This invention relates to the art of injection molding with reinforced thermosetting plastic material, and more particularly, to novel and effective techniques for injection molding with this material articles having open channel sections so as to exhibit superior dimensional stability and freedom from warpage, as well as to the articles so produced.

BACKGROUND OF THE INVENTION

Recent developments in the formulation of reinforced thermosetting plastic materials have imparted to the finalized form of such materials qualities of density, hardness, impact resistance, and the like, which are so improved as to provide strong inducement to substitute such materials in many articles heretofore fabricated of metal alloys.

Considerable benefits are attainable, as a result of such substitution. For instance, in the fabrication of sewing machine frames, which were previously made of cast iron or more recently by aluminum or magnesium alloy die casting techniques, considerable cost reduction is made possible by fabrication of modern reinforced thermosetting plastic materials.

While long and continuous experimentation prior to this invention gave clear indication as to certain aspects which would be necessary for attaining cost effective utilization of these new materials, one problem was encountered which prevented the attainment of a commercially acceptable sewing machine frame. This problem involved warpage of an upwardly open channel section, namely, the free arm portion of the sewing machine bed.

Consultation with persons skilled in the art of molding and fabricating plastic materials resulted in the identification of numerous factors each of which had a small influence on such warpage condition. Included among the factors identified by those skilled in the art were temperature and curing time variations; temperature gradients in the mold; variations of the material composition; dimensioning of parts, wall thicknesses and relocation of reinforcing ribs in the molded article; location and arrangement of knockout devices in the mold; and inclusion of non-plastic reinforcing elements in or on the molded article. All of these factors taken together could not, however, provide a cost effective acceptable solution to the bed warpage problem in a sewing machine frame.

OBJECTS OF THE INVENTION

It is an object of this invention to provide novel and effective techniques for forming articles such as sewing machine frames having channel sections open at one side as is the tubular bed of a sewing machine frame, by injection molding with thermosetting fiber reinforced plastic materials in such a manner that warpage in the resulting molded article is substantially eliminated.

It is an object of this invention to provide novel gating arrangement for injecting thermosetting reinforced plastic materials into a mold such that objectionable warpage of the resulting molded article and particularly portions formed with open channel sections thereof will be eliminated.

Another object of this invention is to provide novel gating arrangements for injecting thermosetting plastic material reinforced with fibers of glass, carbon, or the like into molds so as advantageously to influence the orientation of the reinforcing glass fibers particularly at critical transition locations within the resulting molded article to minimize warpage therein.

It is also an object of this invention to provide articles molded in accordance with the above described techniques which exhibit superior dimensional stability and advantageous freedom from warpage.

SUMMARY OF THE INVENTION

This invention brings to the art of injection molding of thermosetting fiber reinforced plastic material techniques for injecting such material and gating arrangements for leading such material into a mold which techniques are contrary to established practices in this art and contrary to accepted considerations of cost effectiveness therein but which provide for that degree of dimensional stability in molded articles and such freedom from warpage that, with normal attention to other known factors influencing dimensional stability, molded articles may be produced consistently and predictably within acceptable low limits of warpage.

DESCRIPTION OF THE DRAWING

This invention will be understood from the following detailed description when taken in conjunction with the annexed drawing which illustrates a preferred embodiment of this invention and wherein:

FIG. 1 is a perspective view of the underside of a sewing machine frame bed portion with the mold composition in the sprew bushing runner and gating areas attached, i.e., in the condition which exists as the molded article is removed from the mold cavity;

FIG. 2 is a cross sectional view of a mold cavity having configurations required to provide the shape of an article taken substantially along line 2—2 of FIG. 1, and FIG. 3 is a top perspective view of the sewing machine frame bed portion of FIG. 1 after removal of the molding composition in the gate and sprew bushing therefrom.

DETAILED DESCRIPTION OF THE INVENTION

Referring to FIGS. 1 and 3 of the drawing, there is illustrated a sewing machine bed indicated generally at 11, which has been molded in accordance with this invention as viewed from the bottom and from the top, respectively. The bed 11 includes a base section 12 from which a channel section 13 extends in cantilever fashion. The base section 12 is formed with a planar top surface 14 upwardly from which a boss 15 protrudes for accommodating and orienting a bracket arm frame portion (not shown), and downwardly from which depend sidewalls 16 and end walls 17.

The channel section 13 is formed with a planar top surface 18 coplanar with the top surface 14 of the base section 12 and from which depend sidewalls 19 and an end wall 20. The side and end walls 19 and 20 of the channel section 13 are of less vertical dimension than the side and end walls 16 and 17 of the base section so that with the base section providing support for the sewing machine, the channel section will extend in cantilever fashion therefrom and provide a tubular bed or so called free work supporting arm.

Preferrably, the top surface 18 of the channel section 13 is formed with a recess 21 adapted to be closed by a throat plate and/or a slide cover plate (not shown) and arranged to accommodate a loop taker and work feeding instrumentalities (not shown) of conventional design.

As viewed from the underside as shown in FIG. 1, both the base and channel sections 12 and 13 are open to the bottom and are formed with a variety of webs and protrusions extending downwardly from the top surfaces 14 and 18 and between the side and end walls 16, 17 and 19, 20. Included within such structural arrangement in the bed 11 are bearing blocks 22 and 23 for supporting operating shafts (not shown), support blocks 24 for fastenings associated with ancillary mechanism, cover plates, electrical components or the like, and webs 25 for providing structural reinforcement.

FIG. 2 illustrates the cross sectional configuration of mold cavity taken substantially along line 2—2 of FIG. 1 suitable for injection molding the sewing machine bed of FIGS. 1 and 2. The top portion of the mold is indicated at 30 and the bottom portion is indicated at 31, while 32 indicates the parting line between mold sections 30 and 31. Appearing in FIG. 2, are the mold cavity portions for defining the side walls 16 and top surface 14 of the base section 12 as well as those for defining several of the webs 25. FIG. 2 also illustrate sprue-bushing 33 onto which a nozzle (not shown) of conventional injection molding equipment fits for introducing material into the mold. Joining the sprue bushing and extending in communication therewith along the parting line 32 and preferably in the top portion 30 of the mold, is a fan shaped passageway or runner 34 which leads to and communicates with the bottom edge of the mold cavity defining the side wall 16 of the base section 12.

The juncture of the passageway or runner 34 with the mold cavity side wall 16 defining cavity is referred to as the gate and the technique of arranging the passageway or runner 34 so as to join the mold cavity along one extreme edge of the mold cavity is referred to hereinafter as edge gating.

The mold disclosed herein is intended for use with thermosetting plastic composition reinforced with fibers of glass, carbon or the like. Where fiber glass is utilized for such reinforcing, the composition is conventionally referred to as G.R.C., meaning Glass Reinforced Composite. Such compounds, once prepared include chemicals having a finite life in plastic, liquid, or particulate form and which thereafter solidify irreversibly, i.e., they cannot be converted back to plastic or liquid form for remolding. These compounds may be mixed with any of a wide variety of fillers and/or reinforcing materials other than fiber glass filiments which can have effect upon the qualities of the resulting solidified form of the composition.

A typical formulation of G.R.C. material suitable for injection molding in accordance with this invention includes the following ingredients shown in percentages by weight.

| Ingredient | % |
| --- | --- |
| Polyester Thermoset Resin | 21.00 |
| Monomer (Stylene, acrylic, etc.) | 9.00 |
| Thickener (M$_g$O, Urethane, etc.) | 0.40 |
| Mold Release Lubricant (Ca or Zn Stearate) | 1.20 |
| Pigment (iron oxide) | 2.00 |
| Filler (Al$_2$O$_3$3H$_2$O, CaCO$_3$, Kaolin, Clay, etc.) | 48.10 |

-continued

| Ingredient | % |
| --- | --- |
| Catalyst (tertiary butyl peroctoate) | 0.30 |
| Chopped Fiber Glass Strands (¼" Fibers) | 18.00 |

Because the G.R.C. material which solidifies in the sprue bushing 33 and passageway 34, identified by reference characters 33' and 34' respectively, which must be severed from the molded article after removal from the mold cavity, cannot be reliquified and thus cannot be reused; edge gating, while an accepted technique in the metal die casting art where such severed portions may be reused, is not a favored or generally well accepted technique in the art of thermosetting injection molding.

In the present invention, however, it has been discovered that edge gating has not only reduced the warpage of the channel section 13 as compared with central gating arrangements, which are more typical of thermosetting plastic molding techniques, but when edge gated, the resulting molded article has been found to be significantly less sensitive to dimensional instability due to variation of known factors influencing warpage.

X-ray examination of sewing machine beds molding using the edge gating technique of this invention has indicated a fiber orientation largely parallel to the length of the channel section 13 at the juncture of the main and channel section 12 and 13. This fiber orientation which is indicated by the broken wavy lines 40 in FIGS. 1 and 3, is believed to be responsible for the superior dimensional stability and freedom from objectionable warpage of a molded article with a channel section which is attained using the present invention.

We claim:

1. The method of molding with fiber reinforced thermosetting composition a sewing machine bed having a main section and extending from said main section a work supporting channel section having one open side, the method comprising:
    (a) providing a mold formed with a cavity having the shape of said joined main and channel sections;
    (b) injecting the fiber reinforced thermosetting composition into said mold while in a fluid state;
    (c) arranging the orientation of the fibers comprising the reinforcing of said solidified composition largely parallel to the length of said channel section at the juncture of said main and channel sections of said article by the technique of gating the mold so as to control the flow of glass fiber reinforced thermosetting composition to occur generally transversely across said channel section of said mold cavity at the juncture of said main channel sections therof;
    (d) effecting solidification and cure of said injected fiber reinforced composition within said mold.

2. The method of molding with fiber reinforced thermosetting composition a sewing machine bed having a main section and extending from said main section to work supporting channel section having one open side, the method comprising:
    (a) providing a mold formed with a cavity having the shape of said joined main and channel sections;
    (b) injecting the fiber reinforced thermosetting composition into said mold while in a fluid state;
    (c) arranging the orientation of the fibers comprising the reiforcing of said solidified composition largely parallel to the length of said channel section at the juncture of said main and channel sections of said article by the techique of locating the gate for introduction of said fiber reinforced thermosetting composition into said mold cavity at a position substantially laterally opposite the juncture of said main and channel sections in said mold cavity;

(d) effecting solidification of said injected fiber reinforced composition within said mold.

3. The method of molding with fiber reinforced thermosetting composition a sewing machine bed having a main section and extending from said main section a cantilevered work supporting channel section having one open side, the method comprising:

(a) providing a mold formed with a cavity having the shape of a joined main and channel sections;
(b) providing a gate for introduction of said composition into said mold cavity;
(c) injecting said fiber reinforced thermosetting composition into said mold through said gate, opening into said mold cavity, and
(d) locating said gate opening at position substantially laterally opposite the juncture of said main and channel sections of said mold cavity, whereby a fiber orientation at the juncture of the main and channel sections is attained which substantially eliminates warpage of the channel section with respect to the main section.

* * * * *